United States Patent
Chen et al.

(10) Patent No.: US 7,495,925 B2
(45) Date of Patent: Feb. 24, 2009

(54) MOUNTING APPARATUS FOR POWER SUPPLY

(75) Inventors: Yun-Lung Chen, Taipei Hsien (TW); Yu-Ming Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 174 days.

(21) Appl. No.: 11/565,658

(22) Filed: Dec. 1, 2006

(65) Prior Publication Data

US 2008/0130245 A1    Jun. 5, 2008

(51) Int. Cl.
*H05K 7/16* (2006.01)
(52) U.S. Cl. .................................. 361/726; 361/683
(58) Field of Classification Search ................ 361/726, 361/683, 685; 248/298.1
See application file for complete search history.

(56) References Cited

U.S. PATENT DOCUMENTS

| | | | | |
|---|---|---|---|---|
| 5,136,468 A | * | 8/1992 | Wong et al. | ............... 361/683 |
| 5,777,848 A | * | 7/1998 | McAnally et al. | ............ 361/725 |
| 6,944,013 B2 | * | 9/2005 | Yang | .......................... 361/683 |
| 7,079,382 B2 | * | 7/2006 | Chen et al. | ................... 361/685 |
| 7,365,971 B2 | * | 4/2008 | Chen et al. | ................... 361/685 |
| 2005/0111169 A1 | | 5/2005 | Chen et al. | |
| 2007/0153451 A1 | * | 7/2007 | Chen et al. | ................... 361/679 |
| 2008/0137280 A1 | * | 6/2008 | Chen et al. | ................... 361/685 |

* cited by examiner

*Primary Examiner*—Hae Moon Hyeon
(74) *Attorney, Agent, or Firm*—Wei Te Chung

(57) ABSTRACT

A mounting apparatus for power supply includes a chassis for carrying a power supply, a computer case, and a securing bracket. A pivot portion is formed on the chassis. The computer case includes a bottom wall and a rear plate perpendicular to the bottom wall. The rear plate defines a guiding slot for the pivot portion rotating and sliding therein. The securing bracket is mounted to the computer case. The chassis is interengaged with the computer case and/or the securing bracket. The securing bracket includes an elastic blocking member blocking an end of the chassis, for preventing the chassis disengaging from the computer case and/or the securing bracket.

20 Claims, 5 Drawing Sheets

MOUNTING APPARATUS FOR POWER SUPPLY

BACKGROUND OF THE INVENTION

1. Field of the Invention

The present invention relates to mounting apparatus for power supplies, and more particularly to a rotatable mounting apparatus for a power supply.

2. Description of Related Art

In a computer system, a power supply is usually provided and secured with a mounting apparatus. For example, a conventional mounting apparatus includes a chassis and a bracket. The chassis includes a rear panel and a side panel, respectively forming a plurality of supporting plates to support the power supply thereon. The rear panel defines a slot and the side panel defines a pair of locking apertures therein, and the bracket includes a first plate and a second plate. The first plate forms a hook corresponding to the slot of the chassis. The second plate forms a pair of resilient catches corresponding to the locking apertures of the chassis. In assembly, the power supply is placed on the supporting plates of the rear panel and the side panel. The hook of the first plate is engaged into the slot of the rear panel. The catches of the second plate are locked into the locking apertures of the side panel. Thus, the power supply is secured on the rear panel and the side panel of the chassis.

In the mounting apparatus described above, it is convenient to secure the power supply in the chassis. However, in some computer systems, more particularly in some mini computer systems, due to the very small inner space, it is needed to remove the power supply before removal, maintenance, and checking of electronic elements in the chassis, which is very inconvenient.

What is needed, therefore, is a mounting apparatus for a power supply which allows convenient removal, maintenance, and checking of electronic elements in a chassis of a computer system.

SUMMARY OF THE INVENTION

A mounting apparatus for a power supply includes a chassis for carrying the power supply, a computer case, and a securing bracket. A pivot portion is formed on the chassis. The computer case includes a bottom wall and a rear plate perpendicular to the bottom wall. The rear plate defines a guiding slot for the pivot portion rotating and sliding therein. The securing bracket is mounted to the computer case. The chassis is inter-engaged with the computer case and/or the securing bracket. The securing bracket includes an elastic blocking member blocking an end of the chassis, for preventing the chassis disengaging from the computer case and/or the securing bracket.

Other advantages and novel features of the present invention will be drawn from the following detailed description of preferred embodiment with attached drawings, in which:

DETAILED DESCRIPTION OF THE INVENTION

Figure 1:
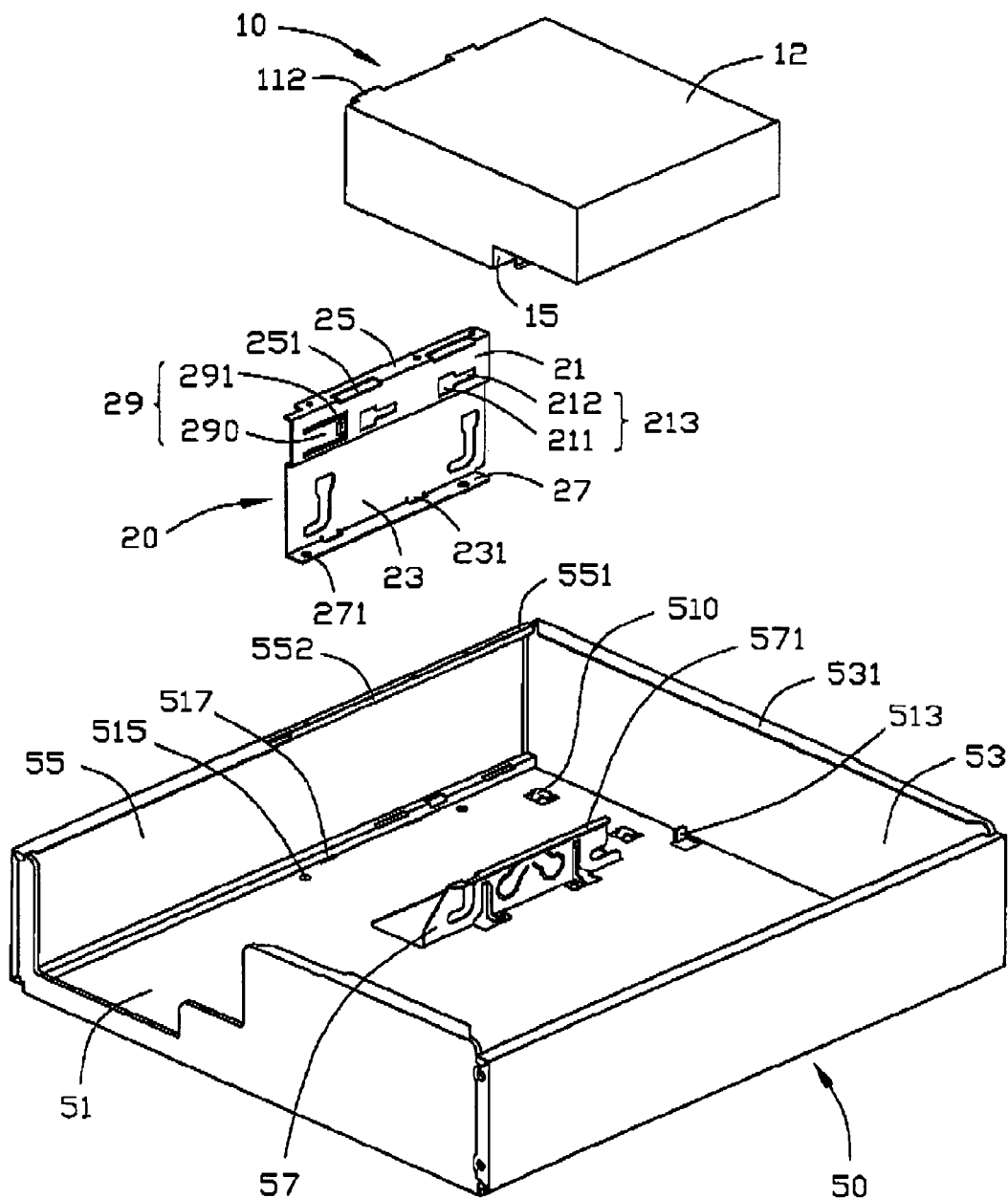
FIG. 1 is an exploded, isometric view of a preferred embodiment of a mounting apparatus for a power supply, including a chassis for carrying the power supply, a securing bracket, and a computer case.
Figure 2:
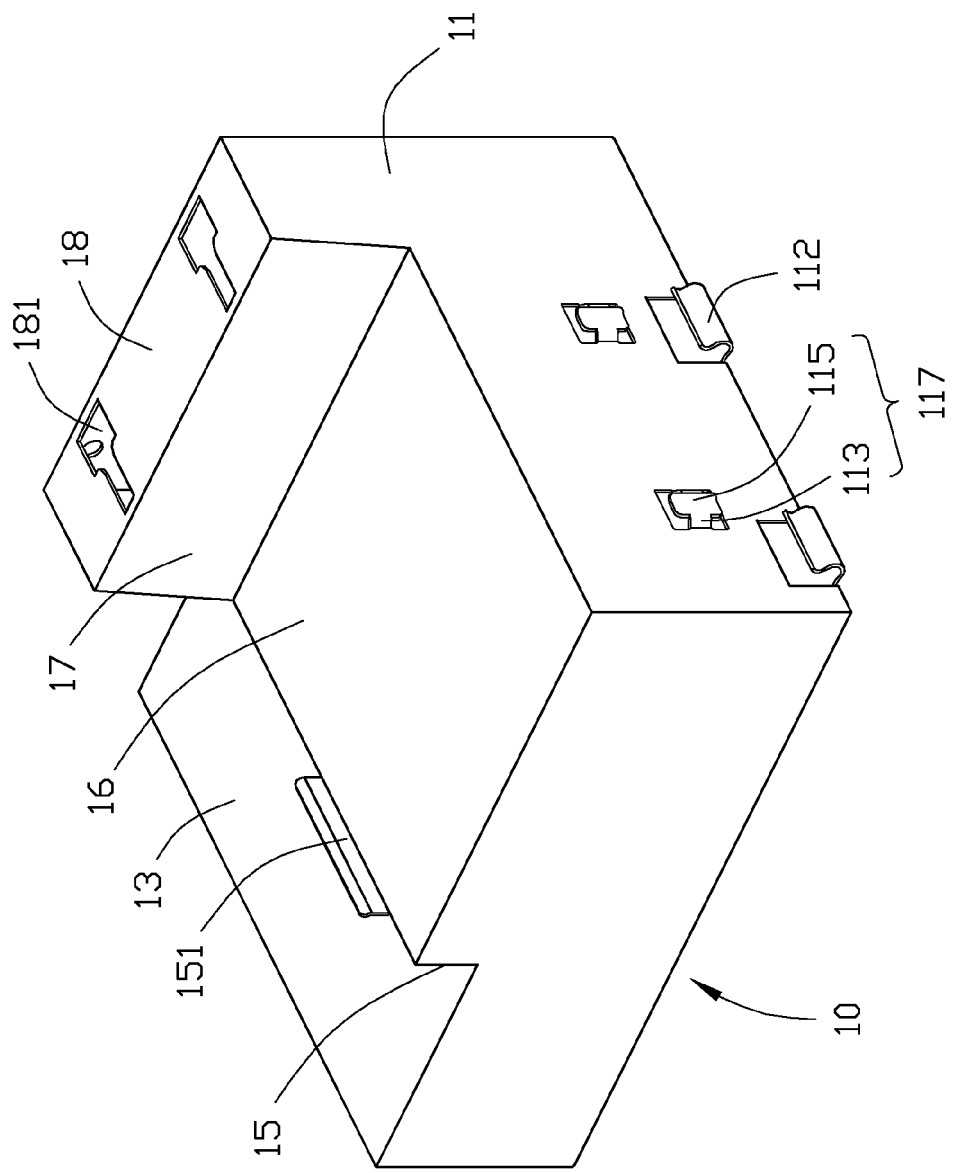
FIG. 2 is an enlarged view of the chassis in FIG. 1, but viewed from another aspect.

Referring to FIGS. 1 and 2, a mounting apparatus for a power supply includes a chassis 10 for carrying the power supply, a computer case 50, and a securing bracket 20 mounted in the computer case 50.

The chassis 10 for carrying the power supply includes a side wall 11, a top wall 12 and a stepped bottom wall each perpendicular to the side wall 11. A pair of pivot portions 112 is formed at a joint of the top wall 12 and the side wall 11. In cross-section, each pivot portion 112 has an open annulus shape with a raised free end. A pair of securing members 117 is formed on the side wall 11 of the chassis below the pivot portions 112. Each securing member 117 includes a pair of narrow bridges 113 respectively connected to the side wall 11 and a wide blocking portion 115 connected between the pair of bridges 113. The bottom wall of the chassis 10 includes a first plate 13 parallel to the top wall 12, a second plate 16 parallel to the first plate 13, and a third plate 18 parallel to the first and second plates 13 and 16. A distance from the top wall 12 to the first plate 13, is less than a distance to the second plate 16, which is less than a distance to the third plate 18. The first and second plates 13 and 16 are connected together by a first connecting wall 15 perpendicular thereto. The second and third plates 16 and 18 are connected together by a second connecting wall 17 perpendicular thereto. The first and second connecting walls 15 and 17 are perpendicular to each other. A blocking flange 151 extends down from the bottom edge of the second plate 16. A pair of securing slots 181 is defined in the third plate 18. Each of the securing slots 181 includes a narrow slot and a wide slot.

Figure 3:
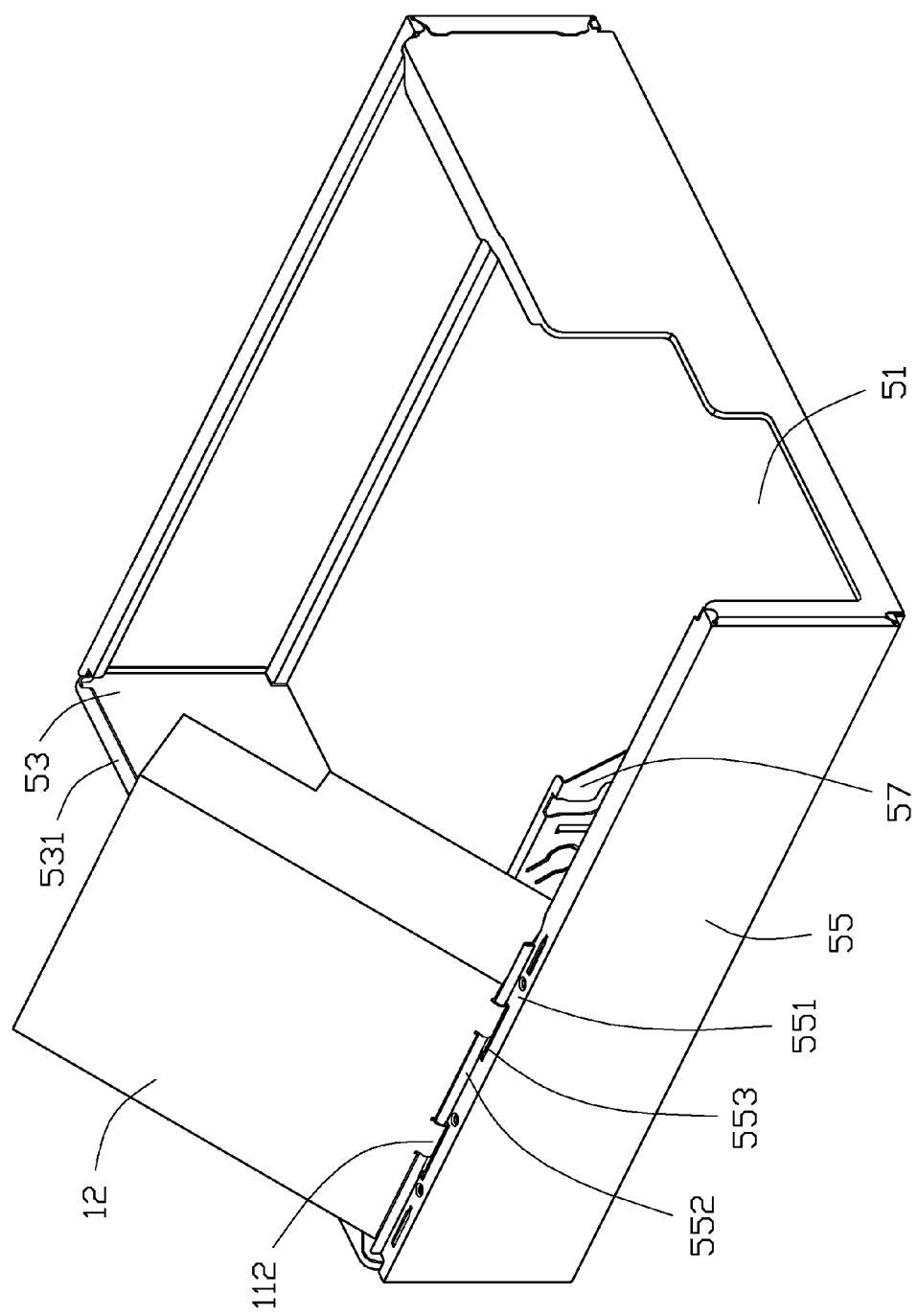
FIG. 3 is an assembled isometric view of the mounting apparatus for a power supply, showing the chassis rotated outward to a certain angle.

The computer case 50 includes a bottom wall 51, a side wall 53 perpendicular to the bottom wall 51, and a rear plate 55 perpendicular to the bottom wall 51 and the side wall 53. A pair of securing members 510 is formed on the bottom wall 51 corresponding to the securing slots 181 of the chassis 10. Each securing member 510 includes a narrow portion and a wide portion. An elastic blocking tab 513 extrudes up from the bottom wall 51 at one side of the securing members 510. A supporting bracket 57 with a supporting flange 571 extending from a top edge thereof is folded up from the bottom wall 51. A pair of receiving holes 515 is defined in the bottom wall 51 adjacent to the rear plate 55. A pair of slots 517 is defined between the pair of receiving holes 515 at a joint of the rear plate 55 and the bottom wall 51. A flange 531 is folded inward from a top edge of the side wall 53 for covering an edge of the top wall 12 of the chassis 10 when the chassis 10 is mounted in the computer case 50. Referring to FIG. 3, a horizontal flange 551 is folded inward from a top edge of the rear plate 55. A vertical supporting flange 552 extends up from an end of the flange 551. A pair of guiding slots 553 is defined at a joint of the flanges 551 and 552 for receiving the pivot portions 112 of the chassis 10. The length of the guiding slot 553 is longer than that of the pivot portions 112. In assembly, the pivot portions 112 slide and rotate in the guiding slots 553.

The securing bracket 20 is substantially S-shaped, including a first body 21 and a second body 23 connected to the first body 21 by a step. A first flange 25 extends out from a top edge of the first body 21. A second flange 27 extends in from a bottom edge of the second body 23. A pair of guiding slots 251 corresponding to the pivot portions 112 of the chassis 10 is defined at a joint of the first flange 251 and the first body 21. The length of the guiding slots 251 substantially equal to that of the guiding slots 553. A pair of securing slot. 213 is defined in the first body 21 of the securing bracket corresponding to the securing members 117 of the chassis 10. Each securing slot 213 includes a wide slot 211 and a narrow slot 212 in communication with the wide slot 211 respectively corresponding to the wide blocking portion 115 and the narrow bridge 113 of each securing member 117. An elastic blocking member 29 is formed beside the securing slots 213 on the first body 21. The elastic blocking member 29 includes a cantilever 290 formed on the first body 21 and a blocking portion 291 protruding from a free end of the cantilever 290. A pair of tabs 231 extends down from a bottom edge of the second body 23, for inserting in the slots 517 in the bottom wall 51 of the computer case 50. A pair of posts 271 protrudes down from the second flange 27 corresponding to the receiving holes 515 of the computer case 50.

Figure 4:
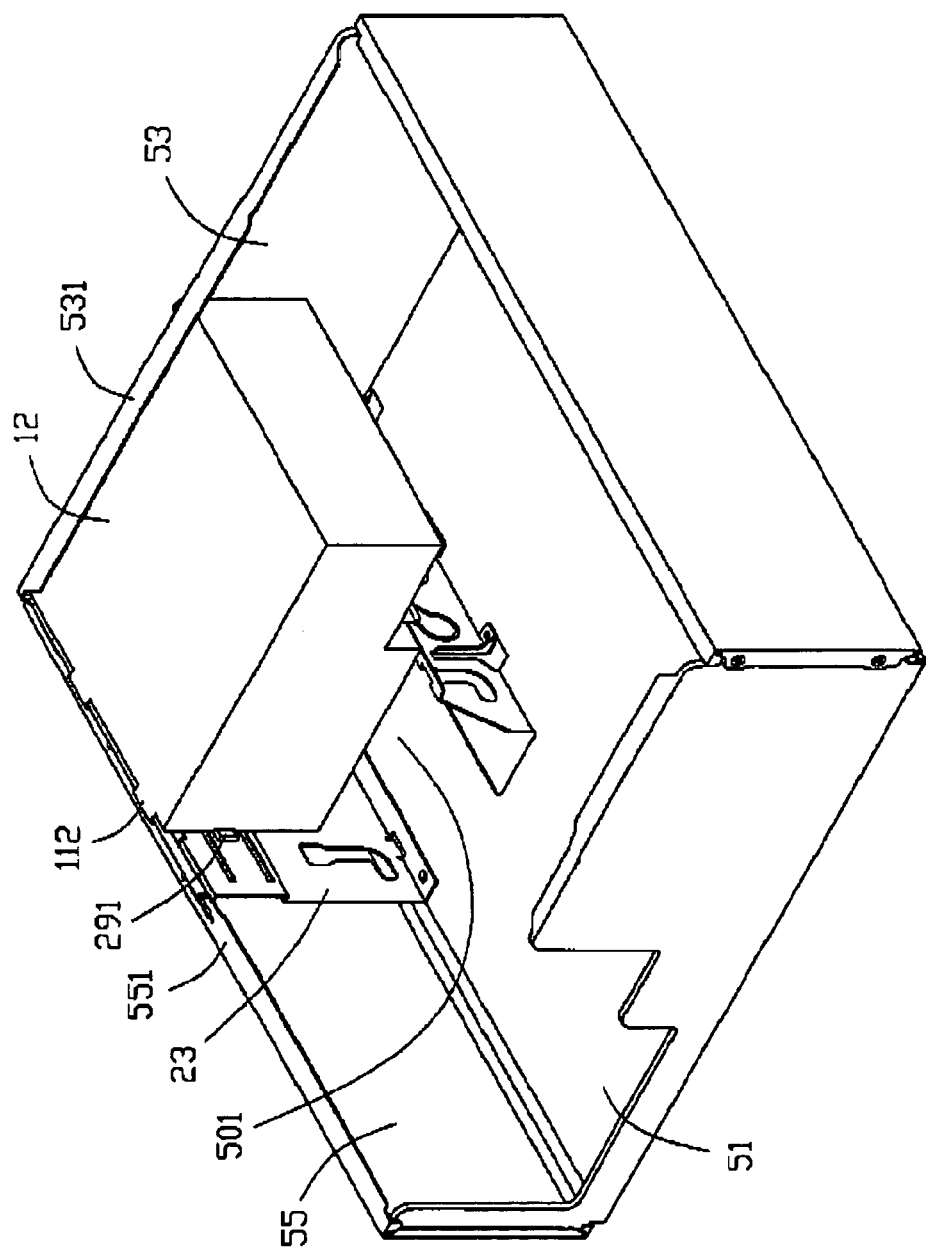
FIG. 4 is an assembled view of the mounting apparatus for a power supply of FIG. 1.
Figure 5:
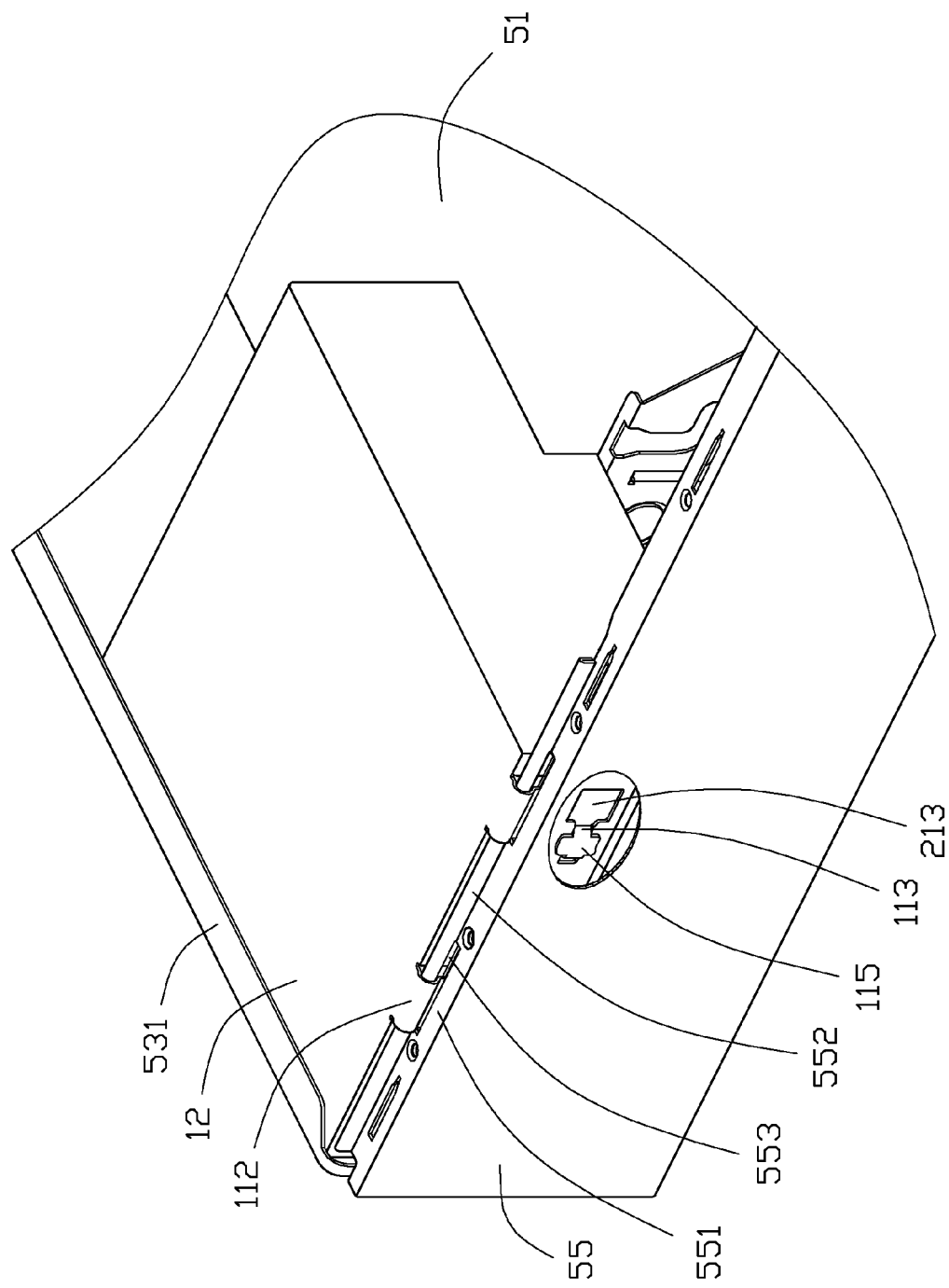
FIG. 5 is an assembled view of the mounting apparatus for a power supply of FIG. 1, with part of the computer case being removed, and viewed from another aspect.

Referring also to FIG. 3 to FIG. 5, in assembly, the posts 271 and the tabs 231 of the securing bracket are respectively inserted in the receiving holes 515 and the slots 517. Then, the securing bracket 20 is mounted to the computer case 50 by. means known by the ordinary person skilled in the art. The first flange 25 is located below and secured to the flange 551 with the guiding slot 251 communicating with the guiding slots 553. The pivot portions 112 are put into the respective guiding slots 553, 251 and supported on the supporting flange 552. The chassis 10 rotates to a horizontal position parallel to the bottom wall 51 of the computer case 10, as shown in FIG. 4. The second plate 16 of the chassis 10 is supported on the supporting flange 571. The side wall 11 of the chassis 10 abuts the first body 21 of the securing bracket 20 and depresses the blocking portion 291 on the first body 21 outwards The wide blocking portions 115 extend through the wide slots 211 and the wide portions of 510 extend through the wide portion of the securing slots 181. Then, the chassis 10 is pushed along the rear plate 55 toward the side wall 53 of the computer case 50. The chassis 10 moves under the flange 531 of the side wall 53, and the top wall 12 of the chassis 10 abuts against the flange 531. The securing members 117 of the chassis 10 engage in the securing slots 213 of the securing bracket 20 with the narrow bridges 113 sliding into the narrow slots 211 and the wide blocking portion 115 blocked by the first body 21, and the securing members 510 of the computer case 50 engage in the securing slots 181 of the chassis 10 with the narrow portion of the securing members 510 slide into the narrow slot of the securing slot 181. An edge of the third plate 18 of the chassis 10 is blocked by the elastic blocking tab 513 of the computer case 50, for limiting a movement of the chassis 10 along a first direction away from the rear plate 55. The side wall 11 of the chassis 10 slides over the elastic blocking member 29 and avoids the blocking portion 291 of the blocking member. The elastic blocking member 29 rebounds back and the blocking portion 291 blocks an edge of the side wall 11 of the chassis, for limiting a movement of the chassis 10 along a second direction away from the side wall 53 of the computer case 10. Thus, the chassis 10 for carrying power supply is secured in the computer case 50. A space 501 is defined between the securing bracket 20 and the supporting bracket 57 for receiving other electronic devices below the second plate 16 of the chassis 10.

In disassembly, the elastic blocking member 29 is depressed toward the rear plate 55 of the computer case 50. The blocking portion 291 of the blocking member 29 sinks down the first body 21 of the securing bracket 20. Then, the chassis 10 is pulled along the rear plate 55 away from the side wall 53 of the computer case 10. The securing members 510 and 117 respectively disengage from the corresponding securing slots 181 and 213. When the top wall 12 of the chassis 10 avoids the flange 531 of the computer case 50, the chassis 10 is rotated outward from the computer case 50. Then, the components in the computer case 10 are accessible to be repaired and/or replaced.

It is to be understood, however, that even though numerous characteristics and advantages have been set forth in the foregoing description of preferred embodiments, together with details of the structure and function, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for a power supply, comprising:
a chassis for carrying a power supply, at least one pivot portion formed on the chassis;
a computer case having a bottom wall and a rear plate perpendicular to the bottom wall, the rear plate defining at least one guiding slot for the at least one pivot portion rotating and sliding therein; and
a securing bracket mounted to the computer case, the chassis inter-engaged with the computer case and/or the securing bracket, the securing bracket comprising an elastic blocking member blocking an end of the chassis, for preventing the chassis disengaging from the computer case and/or the securing bracket.

2. The mounting apparatus for a power supply as described in claim 1, wherein the chassis comprises a side wall, a top wall and a stepped bottom wall respectively perpendicular to the side wall, and the pivot portion formed at a joint of the side wall and the top wall.

3. The mounting apparatus for a power supply as described in claim 2, wherein at least one securing member is formed in the side wall of the chassis, at least one securing slot is defined in the securing bracket corresponding to the securing member.

4. The mounting apparatus for a power supply as described in claim 3, wherein the securing member comprises a pair of narrow bridges connected to the side wall and a wide blocking portion connected between the pair of bridges, and the securing slot comprises a narrow slot and a wide slot in communication with the narrow slot respectively corresponding to the narrow bridges and the wide blocking portion.

5. The mounting apparatus for a power supply as described in claim 2, wherein the stepped bottom wall comprises a first plate, a second plate and a third plate parallel to the top wall of the chassis, a distance from the top wall to the first plate being less than a distance to the second plate, which is less than a distance to the third plate.

6. The mounting apparatus for a power supply as described in claim 5, wherein the first plate and the second plate of the chassis are connected by a first connecting wall, and the second plate and the third plate are connected by a second connecting wall, the first connecting wail and the second connecting wall are perpendicular to each other.

7. The mounting apparatus for a power supply as described in claim 5, wherein the bottom wall of the computer case forms at least one securing member, at least one securing slot is defined in the third plate of the chassis corresponding to the securing member.

8. The mounting apparatus for a power supply as described in claim 1, wherein a supporting bracket with a supporting flange extending from a top edge thereof folds up from the bottom wall of the computer case, for supporting the chassis.

9. The mounting apparatus for a power supply as described in claim 1, wherein the securing bracket comprises a body, the elastic blocking member comprises an elastic cantilever formed on the body and a blocking portion protruding from a free end of the cantilever, for blocking an edge of the chassis.

10. The mounting apparatus for a power supply as described in claim 1, wherein a shape of the pivot portion in cross-section is an unsealed annulus with a raised free end.

11. A mounting apparatus for a power supply, comprising:
a chassis for carrying a power supply, at least one pivot portion formed on the chassis;
a computer case having a bottom wall, a rear plate perpendicular to the bottom wall, and a side wall perpendicular to the bottom wall and the rear plate, the rear plate defining at least one guiding slot configured for allowing the pivot portion to rotate and slide therein resulting in the ability of the chassis to rotate and slide relative to the computer case, an elastic blocking tab extending from the bottom wall for preventing a movement of the chassis along a first direction away from the rear plate, a flange folded inward from a top edge of the side wall for covering on the chassis; and
a securing bracket mounted to the computer case, the securing bracket comprising an elastic blocking member blocking an end of the chassis, for preventing a movement of the chassis along a second direction away from the side wall of the computer case.

12. The mounting apparatus for a power supply as described in claim 11, wherein the chassis comprises a side wall, a top wall and a stepped bottom wall respectively perpendicular to the side wall, and the pivot portion fanned at a joint of the side wall and the top wall.

13. The mounting apparatus for a power supply as described in claim 12, wherein at least one securing member is formed in the side wall of the chassis, at least one securing slot is defined in the securing bracket corresponding to the securing member.

14. The mounting apparatus for a power supply as described in claim 12, wherein the stepped bottom wall comprises a first plate, a second plate and a third plate parallel to the top wall of the chassis, a distance from the top wall to the first plate being less than a distance to the second plate, which is less than a distance to the third plate.

15. The mounting apparatus for a power supply as described in claim 14, wherein the first plate and the second plate of the chassis are connected by a first connecting wall, and the second plate and the third plate are connected by a second connecting wall, the first connecting wall and the second connecting wall are perpendicular to each other.

16. The mounting apparatus for a power supply as described in claim 14, wherein the bottom wall of the computer case forms at least one securing member, at least one securing slot is defined in the third plate of the chassis corresponding to the securing member.

17. The mounting apparatus for a power supply as described in claim 11, wherein the securing bracket comprises a body, the elastic blocking member comprises an elastic cantilever formed on the body and a blocking portion protruding from a free end of the cantilever, for blocking an edge of the chassis.

18. The mounting apparatus for a power supply as described in claim 11, wherein a shape of the pivot portion in cross-section is an unsealed annulus with a raised free end.

19. A mounting apparatus comprising:
a chassis configured to carry a power supply therein, at least one pivot portion formed on the chassis;
a case having a bottom wall and a side wall perpendicular to the bottom wall;
a securing bracket mounted to the case adjacent to the side wall; and
a supporting bracket mounted to the bottom wall and spaced from the securing bracket, wherein
at least one securing slot is defined in the side wall and/or the securing bracket and the at least one first pivot portion is slidably and pivotally engaged with the at least one securing slot in such a manner that the chassis is slidable with respect to the case between a lock position where the chassis seating on the supporting bracket is locked with the case and a released position where the chassis is rotatable to outside of the case, and wherein
the securing bracket comprises an elastic blocking member having a blocking portion which resists against a side of the chassis to stop the chassis sliding from the locked position to the released position, the elastic blocking member being deformable toward the side wall to release the blocking portion from the side of the chassis thereby allowing the chassis sliding from the locked position to the release position.

20. The mounting apparatus as claimed in claim 19, wherein the securing bracket and the supporting bracket cooperatively form therebetween a space configured to receive a data storage device below the chassis.

* * * * *